US012563628B2

(12) United States Patent
Park et al.

(10) Patent No.: US 12,563,628 B2
(45) Date of Patent: Feb. 24, 2026

(54) PERMANENTLY DISABLING A TERMINAL DEVICE

(71) Applicant: SHARP KABUSHIKI KAISHA, Sakai (JP)

(72) Inventors: Kenneth James Park, Cathlamet, WA (US); Atsushi Ishii, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 374 days.

(21) Appl. No.: 18/160,251

(22) Filed: Jan. 26, 2023

(65) Prior Publication Data

US 2024/0260115 A1    Aug. 1, 2024

(51) Int. Cl.
| | |
|---|---|
| *H04W 76/28* | (2018.01) |
| *H04W 52/02* | (2009.01) |
| *H04W 76/20* | (2018.01) |
| *H04W 76/27* | (2018.01) |

(52) U.S. Cl.
CPC .................................. *H04W 76/20* (2018.02)

(58) Field of Classification Search
CPC ..... H04W 76/28; H04W 76/27; H04W 72/02; H04W 72/23; H04W 52/0229; H04W 52/0216; H04W 28/26; H04W 52/0203
See application file for complete search history.

(56) References Cited

U.S. PATENT DOCUMENTS 12,317,224 B2 * 5/2025 Da Silva ........... H04W 52/0229

2005/0240245 A1 10/2005 Bange et al.
2008/0101268 A1  5/2008 Sammour et al.
2019/0297577 A1* 9/2019 Lin ................... H04W 52/0235
(Continued)

FOREIGN PATENT DOCUMENTS

| | | |
|---|---|---|
| EP | 3506686 A1 | 7/2019 |
| WO | 2022086427 A1 | 4/2022 |

OTHER PUBLICATIONS

3GPP TR 22.840 v1.0.0, "3rd Generation Partnership Project; Technical Specification Group Services and System Aspects; Study on Ambient power-enabled Internet of Things (Release 19)," Valbonne, France (Dec. 2022).
(Continued)

*Primary Examiner* — Sai Aung
(74) *Attorney, Agent, or Firm* — ScienBiziP, P.C.

(57) ABSTRACT

A terminal device of a New Radio (NR) system and a corresponding method performed by the terminal device are provided. The method includes receiving, by RF reception circuitry of the terminal device, from a transmitting device while the terminal device resides in an enabled state or a disabled state, a command to permanently disable the terminal device; and transitioning, in response to receiving the command to permanently disable the terminal device, to reside in a permanently disabled state. When the terminal device resides in the enabled state, the RF reception circuitry of the terminal device and RF transmission circuitry of the terminal device are enabled. When the terminal device resides in the disabled state, the RF reception circuitry is enabled and the RF transmission circuitry is disabled. When the terminal device resides in the permanently disabled state, the RF reception circuitry and the RF transmission circuitry are disabled.

12 Claims, 8 Drawing Sheets

(56) References Cited

U.S. PATENT DOCUMENTS

| | | | |
|---|---|---|---|
| 2021/0051759 A1* | 2/2021 | Zhou | H04W 72/23 |
| 2021/0234657 A1* | 7/2021 | Miao | H04W 52/028 |
| 2023/0108216 A1* | 4/2023 | You | H04W 56/0045 |
| | | | 370/503 |
| 2023/0232314 A1* | 7/2023 | Koskinen | H04W 48/12 |
| | | | 370/311 |
| 2025/0150874 A1* | 5/2025 | Kim | H04L 5/001 |

OTHER PUBLICATIONS

3GPP TSG Meeting #95e—SP-220085, "Study on Ambient power-enabled Internet of Things" (Mar. 2022).
3GPP TSG SA Meeting #98e—SP-221267, "Presentation of Specification to TSG or WG (TR 22.840 on Study on Ambient power-enabled Internet of Things (FS_AmbientIoT), Version 1.0.0)" (Dec. 2022).
Parkvall, Stefan and Tomas Palacios, "Xero-energy devices—a new opportunity in 6G" (Sep. 15, 2021; retrieved at <https://www.ericsson.com/en/blog/2021/9/zero-energy-devices-opportunity-6g> on Jan. 25, 2023).
Haridas, Anand, "Extending the lifetime of NB-IoT devices through Energy-Harvesting techniques," Delft University of Technology, Delft, Netherlands (Nov. 7, 2018).

* cited by examiner

PERMANENTLY DISABLING A TERMINAL DEVICE

FIELD

The present disclosure generally relates to wireless communications and, more specifically, to permanently disabling a terminal device (e.g., a User Equipment (UE) of a Fifth-Generation (5G) (e.g., New Radio (NR)) network).

BACKGROUND

A fundamental use case for development of Third-Generation Partnership Project (3GPP) 5G technologies is known as Narrow-Band Internet of Things (NB-IoT)/Machine-Type Communication (MTC). (Two other fundamental use cases include Ultra-Reliable Low-Latency Communications (URLLC) and Enhanced Mobile Broadband (eMBB).)

NB-IoT is a standards-based low-power wide-area (LPWA) technology developed to enable a wide range of new (Internet of Things) IoT devices and services. NB-IoT significantly improves user device power consumption, system capacity, and spectrum efficiency, especially in deep coverage. Battery life of more than ten years may be supported for a wide range of use cases. For 3GPP NR, new physical layer signals and channels are designed to meet the demanding requirement of extended coverage (e.g., for rural and deep-indoor applications) and ultra-low device complexity. The initial cost of NB-IoT modules is expected to be a significant market driver for uptake of this technology, as the underlying technology may be much simpler than existing solutions and its cost is expected to decrease rapidly as demand increases.

MTC (also termed M2M (Machine-to-Machine)) denotes a broad area of wireless communication involving sensors, actuators, physical objects, and other devices not directly operated by humans. MTC denotes a data channel between two entities without the involvement of a human. This communication typically occurs between an MTC device and an MTC server, with a prime example being smart metering for utility services, such as gas, water, and electricity. MTC communication could also potentially occur between MTC devices without the involvement of an MTC server.

To facilitate this fundamental use case in some applications, "ambient-power-enabled Internet of Things" (ambient-power-enabled IoT or ambient-powered IoT) devices may be employed. An ambient-power-enabled IoT device possesses no battery and has no or limited energy storage capability (e.g., via use of a capacitor). Such a device may obtain its operating energy through the harvesting of radio waves, light, motion, heat, or any other suitable power source. An aspect of an ambient-power-enabled IoT device is that it may be inexpensive, and thus may be deployed for a particular use for a limited amount of time, after which it may be discarded. From such a use model arises the question of how the device may be deactivated such that any data acquired by and stored on the device may be protected from unauthorized access.

As described in greater detail below, in employing NR to provide ambient-power-enabled IoT technology, further innovations to the NR system, such as communications between such a device and the network, may be desirable.

SUMMARY

The present disclosure is directed to permanently disabling a terminal device (e.g., a UE serving as an ambient-power-enabled IoT device).

In a first aspect of the present disclosure, a terminal device of a New Radio (NR) system includes: radio frequency (RF) transmission circuitry; RF reception circuitry; one or more non-transitory computer-readable media storing a set of computer-executable instructions; and at least one processor coupled to the one or more non-transitory computer-readable media and configured to execute the set of computer-executable instructions to cause the terminal device to perform operations including: receiving, by the RF reception circuitry from a transmitting device while the terminal device resides in an enabled state or a disabled state, a command to permanently disable the terminal device; and transitioning, in response to receiving the command to permanently disable the terminal device, to reside in a permanently disabled state, wherein: when the terminal device resides in the enabled state, the RF reception circuitry and the RF transmission circuitry are enabled; when the terminal device resides in the disabled state, the RF reception circuitry is enabled and the RF transmission circuitry is disabled; and when the terminal device resides in the permanently disabled state, the RF reception circuitry and the RF transmission circuitry are disabled.

In an implementation of the first aspect, the terminal device includes an ambient-power-enabled Internet-of-Things (IoT) device.

In another implementation of the first aspect, the transmitting device includes a base station.

In another implementation of the first aspect, the terminal device further includes a nonvolatile read-only memory storing a device identifier (ID) for the terminal device, wherein the device ID is unique among a plurality of terminal devices that includes the terminal device, and the command to permanently disable the terminal device includes an indication of the device ID.

In another implementation of the first aspect, the terminal device further includes a nonvolatile memory, wherein the operations further include receiving, from the transmitting device while the terminal device resides in the enabled state or the disabled state, a group identifier (ID) associated with a plurality of terminal devices that includes the terminal device, wherein the command to permanently disable the terminal device includes an indication of the group ID; and storing, in the nonvolatile memory, the group ID.

In another implementation of the first aspect, the operations further include: receiving, from the transmitting device while in the enabled state, a command to transition the terminal device to the disabled state, wherein the command to transition the terminal device to the disabled state comprises a subcommand to clear at least the group ID from the nonvolatile memory; and clearing, in response to receiving the subcommand, at least the group ID from the nonvolatile memory.

In another implementation of the first aspect, the command to permanently disable the terminal device is received from a base station while the terminal device is in a Radio Resource Control (RRC)_IDLE state or an RRC_INACTIVE state and camped on the base station.

In another implementation of the first aspect, the command to permanently disable the terminal device is received in at least one system information block (SIB) transmitted by the base station.

In another implementation of the first aspect, the command to permanently disable the terminal device is received from a base station while the terminal device is in a Radio Resource Control (RRC)_CONNECTED state with the base station.

In another implementation of the first aspect, the command to permanently disable the terminal device is received in an RRC message transmitted by the base station.

In another implementation of the first aspect, the RRC message comprises an RRCReconfiguration message.

In another implementation of the first aspect, the command to permanently disable the terminal device is received in a Non-Access Stratum (NAS) message transmitted by the base station.

In another implementation of the first aspect, the operations further include enabling the RF transmission circuitry; and transmitting, by the RF transmission circuitry to the base station in response to receiving the command to permanently disable the terminal device, an acknowledgment message including at least one of: an indication that the command to permanently disable the terminal device was received by the terminal device; and an indication of whether the terminal device intends to execute the command to permanently disable the terminal device.

In a second aspect of the present disclosure, a method performed by a terminal device of a New Radio (NR) system includes receiving, by RF reception circuitry of the terminal device, from a transmitting device while the terminal device resides in an enabled state or a disabled state, a command to permanently disable the terminal device; and transitioning, in response to receiving the command to permanently disable the terminal device, to reside in a permanently disabled state, wherein: when the terminal device resides in the enabled state, the RF reception circuitry of the terminal device and RF transmission circuitry of the terminal device are enabled; when the terminal device resides in the disabled state, the RF reception circuitry is enabled and the RF transmission circuitry is disabled; and when the terminal device resides in the permanently disabled state, the RF reception circuitry and the RF transmission circuitry are disabled.

In a third aspect of the present disclosure, a transmitting device of a New Radio (NR) system includes: radio frequency (RF) transmission circuitry; one or more non-transitory computer-readable media storing a set of computer-executable instructions; and at least one processor coupled to the one or more non-transitory computer-readable media and configured to execute the set of computer-executable instructions to cause the transmitting device to perform operations including transmitting, to a terminal device that resides in an enabled state or a disabled state, a command to permanently disable the terminal device, wherein: the terminal device, in response to receiving the command by RF reception circuitry of the terminal device to permanently disable the terminal device, transitions to reside in a permanently disabled state; when the terminal device resides in the enabled state, the RF reception circuitry of the terminal device and RF transmission circuitry of the terminal device are enabled; when the terminal device resides in the disabled state, the RF reception circuitry of the terminal device is enabled and the RF transmission circuitry of the terminal device is disabled; and when the terminal device resides in the permanently disabled state, the RF reception circuitry of the terminal device and the RF transmission circuitry of the terminal device are disabled.

BRIEF DESCRIPTION OF THE DRAWINGS

Implementations of the present technology will now be described, by way of example only, with reference to the attached figures.

DESCRIPTION

Figure 1:
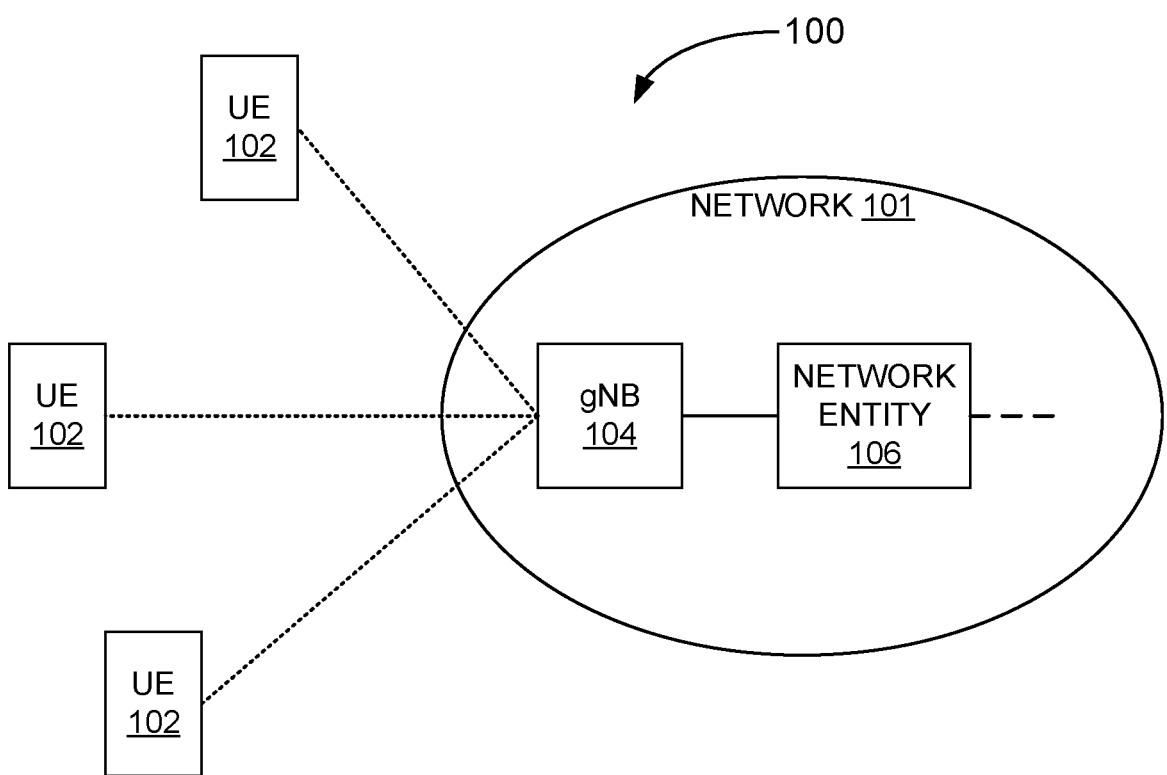
FIG. 1 is a block diagram illustrating a communication system including a plurality of terminal devices (e.g., UEs serving as ambient-power-enabled IoTs) in communication with an associated network, according to an example implementation of the present disclosure.

The 3GPP is a collaboration agreement that aims to define globally applicable technical specifications and technical reports for third and fourth generation wireless communication systems. The 3GPP may also define specifications for next-generation mobile networks, systems, and devices.

3GPP Long-Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A), and other standards (e.g., 3GPP Releases (Rel) 8, 9, 10, 11, 12, 13, 14, 15, and so on) including New Radio (NR), which is also known as 5G. However, the scope of the present disclosure should not be limited in this regard. At least some aspects of the systems and methods disclosed herein may be utilized in other types of wireless communication systems.

A wireless communication device may be an electronic device used to communicate voice and/or data to a base station (BS), which in turn may communicate with a network of devices (e.g., a public switched telephone network (PSTN), the Internet, etc.). In describing systems and methods herein, a wireless communication device may alternatively be referred to as a mobile station, a user equipment (UE), an access terminal, a subscriber station, a mobile terminal, a remote station, a user terminal, a terminal, a subscriber unit, a mobile device, etc. Examples of wireless communication devices may include cellular phones, smart phones, personal digital assistants (PDAs), laptop computers, netbooks, e-readers, wireless modems, etc.

In the 3GPP specifications, a wireless communication device may typically be referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In the 3GPP specifications, a BS is typically referred to as a NodeB, an evolved NodeB (eNB), a home enhanced or evolved NodeB (HeNB), a Next Generation NodeB (gNB), or some other similar terminology. As the scope of the disclosure should not be limited to 3GPP standards, the terms "base station," "NodeB," "eNB," "HeNB," and "gNB" may be used interchangeably herein to mean the more general term "base station." Furthermore, the term "base station" or "BS" may be used to denote an access point. An access point may be an electronic device that provides access to a network (e.g., a Local Area Network (LAN), the Internet, etc.) for wireless communication devices. The term "communication device" may be used to denote both a wireless communication device and/or a base station. An eNB and/or gNB may also be more generally referred to as a base station device.

It should be noted that, as used herein, a "cell" may be any communication channel that is specified by standardization or regulatory bodies to be used for International Mobile Telecommunications-Advanced (IMT-Advanced), and all of IMT-Advanced, or a subset thereof, may be adopted by 3GPP as licensed bands (e.g., frequency bands) to be used for communication between an eNB and a UE. It should also be noted that in the E-UTRA and E-UTRAN overall description, as used herein, a "cell" may be defined as a "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB and/or gNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s).

"Activated cells" are those configured cells on which the UE is transmitting and receiving. That is, activated cells are those cells for which the UE monitors the physical downlink control channel (PDCCH) and, in the case of a downlink transmission, those cells for which the UE decodes a physical downlink shared channel (PDSCH). "Deactivated cells" are those configured cells for which the UE is not monitoring the transmission of PDCCH. It should be noted that a "cell" may be described in terms of differing dimensions. For example, a "cell" may have temporal, spatial (e.g., geographical), and frequency characteristics.

The 5G communication systems, dubbed New Radio (NR) technologies by the 3GPP, envision the use of time/frequency/space resources to allow for services, such as Enhanced Mobile Broadband (eMBB) transmission, Ultra-Reliable Low-Latency Communications (URLLC) transmission, and massive Machine Type Communication (mMTC) transmission. Also, in NR, single-beam and/or multi-beam operations are considered for downlink and/or uplink transmissions.

Various examples of the systems and methods disclosed herein are now described with reference to the figures, where like reference numbers may indicate functionally similar elements. The systems and methods as generally described and illustrated in the figures herein could be arranged and designed in a wide variety of different implementations. Therefore, the detailed description of the present disclosure as illustrated in the figures is not intended to limit the scope of the present disclosure but is merely representative of the systems and methods.

A basic discussion of some aspects of NR communication technology is provided below, followed by a more specific discussion relating to embodiments described in the present disclosure.

NR System Information

System Information (SI) in NR includes a Master Information Block (MIB) and a number of System Information Blocks (SIBs), which are divided into Minimum SI and Other SI. Minimum SI carries basic information required for initial access and for acquiring any other SI. Minimum SI includes MIB and SIB1. For a UE to be allowed to camp on a cell, it may have acquired the contents of the Minimum SI from that cell. Other SI includes all SIBs not broadcast in the Minimum SI. The UE may not need to receive these SIBs before accessing the cell.

The MIB may provide for a System Frame Number (SFN), critical information for the reception of SIB1 (e.g., subcarrier spacing (SCS), subcarrier offset, Demodulation Reference Signal (DMRS) position, and/or PDCCH configuration), a cell barred flag, and/or an intra-frequency reselection allowed flag. The MIB may be mapped on to a Broadcast Control Channel (BCCH) logical channel and may be carried on a Broadcast Channel (BCH) transport channel. The BCH is then mapped onto a Physical Broadcast Channel (PBCH).

The MIB may be transmitted with a periodicity of 80 milliseconds (ms) and may be repeated (according to Synchronization Signal Block (SSB) periodicity) within the 80 ms. MIB contents may be the same over the 80 ms period, and the same MIB may be transmitted over all SSBs within the Synchronization Signal (SS) burst set. The MIB may provide the UE with parameters (e.g., Control Resource Set #0 (CORESET#0) configuration) required to acquire SIB1 (e.g., more specifically, information useful for monitoring of a PDCCH for scheduling a PDSCH that carries SIB1).

SIB1 may provide cell selection information, a Public Land Mobile Network (PLMN) list, cell ID, tracking area code, RAN area code, cell reserved flag, connection establishment failure control information, SI scheduling information, serving cell common uplink and downlink configurations (e.g., configuration information for a Random Access Channel (RACH), paging, etc.), Supplementary UL (SUL) configuration, SSB scheduling information, cell-specific Time-Division Duplex (TDD) UL/DL configurations, a cell's Internet Protocol (IP) Multimedia Subsystem (IMS) emergency bearer support flag (e.g., for UEs in limited service), emergency call over IMS support flag, a UE's timers and constants, access control information, etc.

The SIB1 may carry the most critical information required for the UE to access the cell (e.g., random access parameters). The SIB1 may include information regarding the availability and scheduling of other SIBs (e.g., mapping of SIBs to SI message, periodicity, SI window size, etc.). SIB1 may also indicate whether one or more SIBs are only provided on-demand, in which case SIB1 may also provide a PRACH configuration needed by the UE to request the required SI. The SIB1 may be transmitted on the Downlink Shared Channel (DL-SCH (e.g., a logical channel—BCCH)) with a periodicity of 160 ms and variable transmission repetition periodicity within 160 ms. The SIB1 may be a cell-specific SIB.

The UE may acquire the SI upon cell selection (e.g., upon power on), cell reselection, return from out of coverage, after reconfiguration with synchronization completion, after entering the network from another Radio Access Technology (RAT), upon receiving an indication that the SI has changed, upon receiving a PWS (Public Warning System) notification, and/or whenever the UE does not have a valid version of a stored SIB.

Support of Ultra-Low-Power Applications

For Rel-19, the 3GPP Service and System Aspects (SA) Working Group 1 (SA1) conducted a Stage-1-level study (e.g., an overall service description) regarding the support of ultra-low-power applications, where the power requirements of such a device may be satisfied via local energy harvesting by the device (e.g., in which no battery is required by the device, as sufficient operating energy may be derived from the local environment and used either immediately, or stored in a capacitor for later use). The SA1 Stage 1 study was concluded in December 2022, with the results captured in Technical Report (TR) 22.840 v1.0.0. The study covered use cases, traffic scenarios, and device constraints of ambient-power-enabled IoT devices and identified new potential service requirements, as well as new key performance indicators (KPIs), related to 3GPP NR-type devices, access networks, and core networks.

The study was preceded by an agreement in SA1 of a Work Item Description (WID) document. That document provides the justification for the work and an outline of the scope of the work that is expected to take place with respect to developing the TR. The latest revision of the WID can be found in SP-220085.

As discussed in the justification section of the WID, mMTC is an important use case for 5G. However, other important use cases and scenarios are not adequately covered by Rel-18 technologies:

1) Device with ultra-low complexity
2) Device with a very small size/form factor (e.g., thickness of a millimeter (mm))
3) Device that is maintenance-free (e.g., no need to replace a conventional battery)
4) Device with a long lifecycle
5) Device deployed where a conventional battery is not applicable To address at least the use cases listed above, SA1 agreed to a study on IoT service using an IoT device powered by energy harvesting (in other words, an ambient-power-enabled IoT device), where a device powered by such energy harvesting can support IoT communications without relying on a conventional power source and/or avoids human intervention for recharging or replacing. In addition to the low power consumption of such an ambient-power-enabled IoT device, the study also considers low device complexity, small device size, and a device with a long lifecycle.

Typically, an ambient-power-enabled IoT device doesn't use a conventional battery. Such a device is capable of harvesting, storing, and subsequently using, or harvesting and immediately using, energy from wireless radio waves or any other form of energy that can be locally obtained to meet the needs of a particular use case. For example, in some scenarios, an ambient-power-enabled IoT device can harvest energy from radio waves, where the radio waves may come from 5G NR network entities (e.g., a gNB or a Customer Premise Equipment (CPE)) or User Equipment (UE) (e.g., a handheld device or another IoT device). In some other scenarios, an ambient-power-enabled IoT device may harvest energy from solar energy, motion/vibration, heat, pressure, or any other potential energy differential.

Some of the potential challenges for ambient-power-enabled IoT technology include:

1) An extremely-low-complexity device form factor
2) An ability to harvest energy and at the same time use the harvested energy to support communication
3) A capability to provide sufficient communication services to fulfil the corresponding requirements
4) A capability to provide user privacy
5) A capability to provide data security In many use cases, the lifecycle of an ambient-power-enabled IoT device should be properly managed to meet user and institutional expectations. For example, when an ambient-power-enabled IoT device is deployed to track an item in a warehouse, the device may only be intended to be used when the tracked item is being transferred, stored, loaded/unloaded, and inventoried in the warehouse. Subsequent to its use in the warehouse, the device may then be discarded due to its low cost. Thus, in the interest of protecting the privacy and security of information that may be retained on the device, the device may not be allowed access to or by the 5G system (5GS) when the device has come to the end of its intended use. In addition, the device may not be allowed access to or by the 5GS when the device has come to an end of its intended use to avoid interference to other devices that may be using resources of the 5GS (e.g., radio frequency (RF) resources).

In Section 17 of TR 22.840, a "Use case on Device Activation and Deactivation" (referred to herein as Use Case 5.17) is captured. This use case identifies the need to not only activate an ambient-power-enabled IoT device (e.g., an ambient IoT with environmental sensors), but also the need to deactivate the device once the device is no longer needed.

More specifically, when an ambient-power-enabled IoT device is initially deployed (e.g., at the beginning of its intended use), the device may initially be in an operational state of DISABLED and will require the reception of an Enable command to trigger a change of state of the device to an operational state of ENABLED. When the device is in the operational state of ENABLED, the device may establish a communications channel with the 5GS, whereby the device may receive, from the 5GS, configuration data, operational commands, and parameters. The device may also transmit data to the 5GS that may include data, commands, and parameters.

When the device has completed its intended use, the device may transition from an operational state of ENABLED to an operational state of DISABLED upon the receipt of a Disable command to trigger a change of state of the device to the operational state of DISABLED. In some implementations, the Disable command may include a sub-command to trigger the device to clear any configuration data and parameters stored on the device (e.g., returning the device to a factory reset configuration).

Thus, the operational lifecycle of the device may be DISABLED (e.g., at the time of manufacture of the device), ENABLED (e.g., at the time of the intended use of the device), and finally DISABLED (e.g., at the time of end of intended use). Consequently, as described above, the initial and ending operational states of the device are the same state of DISABLED with respect to the device's ability to establish a communication channel with the 5GS. As such, a device that is in the DISABLED state following the end of its intended use may terminate communications with the 5GS and can subsequently be triggered to change to its state to ENABLED and again establish communications with the 5GS.

As noted in Requirement 5.17.6 of TR 22.840, the 5G system may provide means for an authorized user or authorized third parties to request enabling and disabling an ambient IoT device capability to transmit RF signals. From this requirement, an ambient-power-enabled IoT device, defined therein, is configurable for two states: ENABLED and DISABLED.

For an ambient-power-enabled IoT device in the ENABLED state, the device may be able to use its RF reception circuitry to receive RF energy for the purposes of (1) harvesting RF energy so that it may be stored in a capacitor for later use to power the operations of the device, or used immediately to power the operations of the device and (2) decoding information that may be encoded on the RF waveform, where the information may include commands from a transmitting device related to the operation of the IoT device or data from a transmitting device related to the configuration of the IoT device.

Furthermore, an ambient-power-enabled IoT device that is in the ENABLED state may be triggered to use its RF transmission circuitry to transmit an RF energy waveform that has information encoded thereupon, where the information may include commands for execution by another device that are related to the operation of the ambient-power-enabled IoT device, and/or may include data from the device to another device that is related to the operation of the device. The source of such a trigger may be from a process that is internal to the device (e.g., the expiration of a timer) or external to the device (e.g., a command received by the device via a received and decoded RF waveform).

For an ambient-power-enabled IoT device in the DISABLED state, the device is able to use its RF reception circuitry to receive RF energy for the purpose of (1) harvesting RF energy so that it may be stored into a capacitor for later use to power the operations of the device, or used immediately to power the operations of the device except for operations of the device that include the transmission of an RF waveform, and (2) decoding information that may be encoded on the RF waveform, where the information may include commands from a transmitting device related to the operation of the device or data from a transmitting device related to the configuration of the device.

Furthermore, an ambient power-enabled IoT device that is in the DISABLED state may be triggered to change from the DISABLED state to the ENABLED state such that the device may then use its RF transmission circuitry to transmit an RF energy waveform that has information encoded thereupon, where the information may include commands for execution by another device that are related to the operation of the ambient-power-enabled IoT device, or may include data from the device related to the operation of the device. In some implementations, the source of such a trigger may be from a process that is external to the device (e.g., a command received by the device via a received and decoded RF waveform), and not from a process that is internal to the device (e.g., the expiration of a timer).

Thus, Requirement 5.17.6 of TR 22.840 provides that the device shall be able to receive a command that either (1) changes the state of the device from DISABLED (not able to transmit RF signals, but able to receive and decode RF signals) to ENABLED (able to transmit RF signals, and able to receive and decode RF signals) or (2) changes the state of the device from ENABLED to DISABLED.

Also, as noted in Requirement 5.21.6 of TR 22.840, "The 5G system shall be able to support suitable security mechanisms for Ambient IoT devices, including encryption and data integrity." From this Requirement, an ambient-power-enabled IoT device must be able to protect the configuration data, operational data, and parameters that are stored on the device from being accessed by an unauthorized user, such as a "bad actor".

The Requirements for an ambient-power-enabled IoT device, as presented in TR 22.840, indicate that before the start of the device operational lifecycle, and at the end of the device operational lifecycle, the device should be in a DISABLED state in which it cannot transmit RF energy, and during the device operational lifecycle, the device should be capable of changing between a state of ENABLED in which it can transmit RF energy and a state of DISABLED where it cannot transmit RF energy. As such, the device can be commanded to change its state from DISABLED to ENABLED and back to DISABLED multiple times, where such a command may be transmitted by a gNB or other authorized transmitting device and is received, decoded, and acted upon by the device. In some implementations, the DISABLED state may be viewed as a desired lower-power state relative to the ENABLED state due to the lack of transmission capability associated with the DISABLED state.

Accordingly, the 5G system may support suitable security mechanisms for ambient-power-enabled IoT devices to protect valuable and proprietary configuration data and operational data that may be stored on the device during its operational lifecycle against access by unauthorized users (e.g., bad actors).

While encryption of the data prior to its transport between an authorized user and an ambient-power-enabled IoT device sending and receiving device may be considered a first layer of data security, such encryption is not always sufficient to prevent a bad actor from accessing the device (either physically or electronically via the RF receiver) and obtaining access to the data contained therein via an forged Enable command and decryption methods or physical interrogation methods.

Thus, there is a need for such a device to include a feature that will physically and permanently disable (e.g., destroy) the operational properties of the device to prevent any bad actor from accessing or reverse engineering any data that may be stored on the device. Currently, no method or command is defined in the 3GPP NR protocol that facilitates such permanent disablement of a device, such as a device identified by a device-specific and unique serial number, or a grouping of specific devices associated via a group serial number.

As used in the present disclosure, the term "permanently disabled" may refer to a state (e.g., a DISABLED_PERMANENTLY state) of a device that irreversibly prevents access of any data stored in the device from a location external to the device, such as by way of direct physical (wired) or wireless connection, and/or by way of physical (e.g., mechanical, optical, and the like) intrusion. In some examples, a permanently disabled device may not be able to transmit or receive RF waveforms, access internal memory, operate an onboard processor, and/or perform other operations associated with an enabled state. In some implementations, permanently disabling a device may be performed in response to a received command from an authorized transmitting device and accomplished electronically, such as by way of permanently disabling one or more functions or circuits of the device (e.g., via fusible links or other physical means). Consequently, when a device is permanently disabled, no data and/or configuration parameters stored on the device are at risk of access or use by a bad actor.

Support for a Disabled_Permanently State

FIG. 1 is a block diagram illustrating a communication system 100 including a plurality of terminal devices (e.g., UEs 102 serving as ambient-power-enabled IoTs) in communication with an associated network 101, according to an example implementation of the present disclosure. While three UEs 102 are depicted in FIG. 1, fewer or greater numbers of UEs 102 may be included in communication system 100 in other examples. In some implementations, each UE 102 may be identified with a UE-specific serial number (e.g., stored in nonvolatile read-only memory, such as at the time of manufacture of UE 102). Also, in some implementations, one or more UEs 102 may form an ambient-power-enabled IoT group that is identified with a serial number corresponding to the group (e.g., stored in a rewritable nonvolatile memory).

Network 101 may communicate with UEs 102 by way of a base station (e.g., a gNB 104) included therein. In some implementations, gNB 104 may be communicatively coupled with a network entity 106. Examples of network entity 106 may include, but are not limited to, a server or node in a core network (CN) (e.g., an Access and Mobility Management Function (AMF)) or a server resident in a private/public network.

Figure 2:
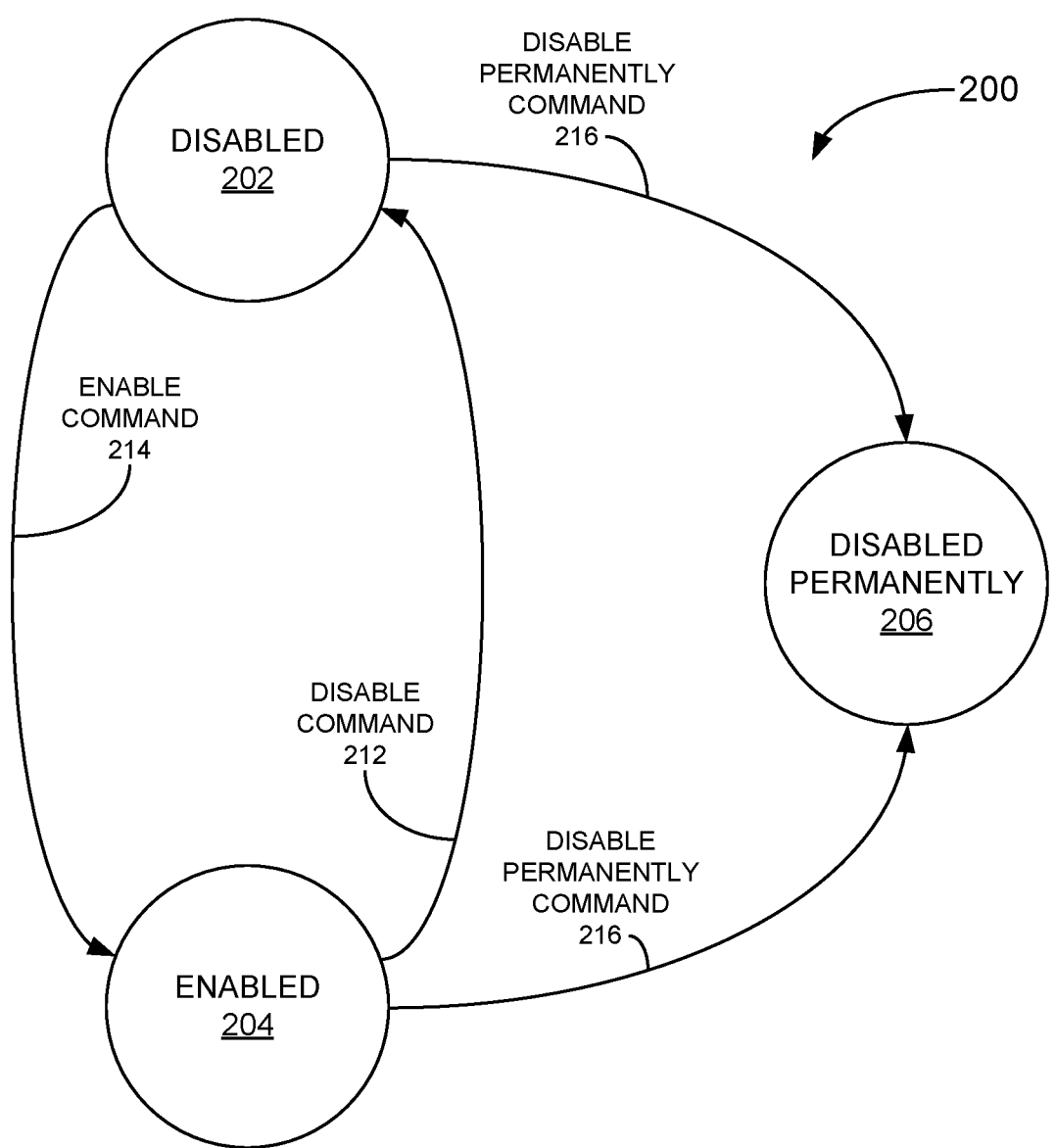
FIG. 2 is a state diagram illustrating states among which a terminal device may transition, according to an example implementation of the present disclosure.

FIG. 2 is a state diagram 200 illustrating states among which a terminal device (e.g., UE 102 of FIG. 1) may transition, according to an example implementation of the present disclosure. As shown in FIG. 2, the states may include a DISABLED state 202, an ENABLED state 204, and a DISABLED_PERMANENTLY state 206.

In some implementations, while in the DISABLED state 202, the terminal device may be able to receive signals (e.g., the RF receiving circuitry of the terminal device is enabled to receive signals from an authorized transmitting device), but may be unable to transmit signals (e.g., the RF transmitting circuitry of the terminal device is disabled from transmitting signals). In the ENABLED state 204, in some implementations, the terminal device may be able to both receive and transmit signals (e.g., the RF receiving and transmitting circuitry of the terminal device may be enabled). Also, in some implementations, in the DISABLED_PERMANENTLY state 206, the terminal device may be unable to either transmit or receive signals (e.g., the RF receiving and transmitting circuitry of the terminal device may be disabled).

The terminal device may transition among states 202, 204, and 206 in response to commands executed by the terminal device that are received from an authorized transmitting device (e.g., gNB 104 of FIG. 1). In some examples, the commands may be provided to the gNB by way of another system (e.g., network entity 106 of FIG. 1), which may be in communication with an authorized user (e.g., an owner or manager of UEs 102). In some implementations, the terminal device may execute such commands in response to another event or stimulus detected by the terminal device and/or originating within the terminal device, such as the detection of a one or more conditions, the expiration of a timer, and so on. As illustrated in FIG. 2, the commands may include a Disable command 212, an Enable command 214, and a Disable Permanently command 216, in which each command, when executed by the receiving terminal device, may cause a transition of the terminal device to a corresponding state.

In some implementations, the terminal device may initially reside in the DISABLED state 202 at the time that the manufacturing of the terminal device is complete. In that state, the terminal device may be able to receive signals but be unable to transmit signals. Thereafter, an authorized transmitting device may transmit an Enable command 214 that, when received and executed by the terminal device, may cause the terminal device to enable its transmitting circuitry, thus allowing the terminal device to transmit and receive signals. One or more authorized transmitting devices, during the lifecycle of the terminal device, may then transmit any number of Disable commands 212 and Enable commands 214 that, when received and executed by the terminal device, may alternatively place the terminal device in the DISABLED state 202 and the ENABLED state 204, according to the needs of the system or the authorized user. For example, at time when the terminal device is to be inactive or dormant, the terminal device may be placed in the DISABLED state 202 to reduce power consumption (e.g., due to the lack of signal transmission by the terminal device in that state).

If the functionality of the terminal device is no longer needed at some point (e.g., if the terminal device is to be discarded), an authorized transmitting device may transmit a Disable Permanently command 216 that, when received and executed by the terminal device, causes the terminal device to transition to the DISABLED_PERMANENTLY state 206, thus permanently disabling the terminal device (e.g., by at least disabling both its transmitting and receiving circuitry), which may render the terminal device incapable of receiving commands from other devices or transmitting data to other devices. In some implementations, as shown in FIG. 2, the terminal device may be in either the DISABLED state 202 or the ENABLED state 204 when receiving the Disable Permanently command.

In view of the above description, the ambient-power-enabled IoT feature set may include the ability of a gNB or other authorized transmitting device to transmit an Enable command 214 to the terminal device and transmit a Disable command 212 to the terminal device. Accordingly, the device may receive the Enable command 214 and the Disable command 212 from the transmitting device and may respond accordingly by enabling its ability to transmit RF energy or disable its ability to transmit RF energy.

In some implementations, the ambient-power-enabled IoT feature set may further facilitate the ability of a gNB or other authorized transmitting device to transmit a Disable Permanently command 216 to the terminal device that, once received by the device, may trigger the device to change its state from the ENABLED state 204, in which the device is capable of transmitting RF energy and receiving RF energy, to a state (DISABLED_PERMANENTLY state 206) that will permanently terminate the functionality of the device with respect to at least the transmission of RF energy and the reception/decoding of RF energy.

In some implementations, the ambient-power-enabled IoT feature set may further facilitate the ability of a gNB or other authorized transmitting device to transmit a Disable Permanently command 216 to the terminal device that, once received by the device, may trigger the device to change its state from the DISABLED state 206, in which the device is incapable of transmitting RF energy and capable of receiving RF energy, to a state (DISABLED_PERMANENTLY state 206) that will permanently terminate the functionality of the device with respect to at least the transmission of RF energy and the reception/decoding of RF energy.

In some implementations, the ambient-power-enabled IoT feature set may further facilitate the ability of the terminal device such that, following the receipt by the device of a Disable Permanently command 216 to change the state of the device to a state that will terminate the device's functionality (DISABLED_PERMANENTLY state 206) and prior to the device executing that command, the device may transmit to the authorized transmitting device an acknowledgement message, where the acknowledgement message may indicate receipt of the command and/or may indicate the device's intent to execute the command immediately following the transmission of the acknowledgement message.

In some implementations, the ambient-power-enabled IoT feature set may facilitate the ability of the terminal device such that following the receipt by the device from an authorized transmitting device of an Enable command 214 to change the state of the device from the DISABLED state 202 to the ENABLED state 204, the device may transmit to the transmitting device an acknowledgement message, where the acknowledgement message may indicate receipt of the Enable command 214.

In some implementations, the ambient-power-enabled IoT feature set may facilitate the ability of the terminal device such that following the receipt by the device from an authorized transmitting device of a Disable command 212 to change the state of the device from the ENABLED state 204 to the DISABLED state 202, the device may transmit, before executing the Disable command 212, to the transmitting device an acknowledgement message, where the acknowledgement message may indicate receipt of the Disable command 212.

Figure 3:
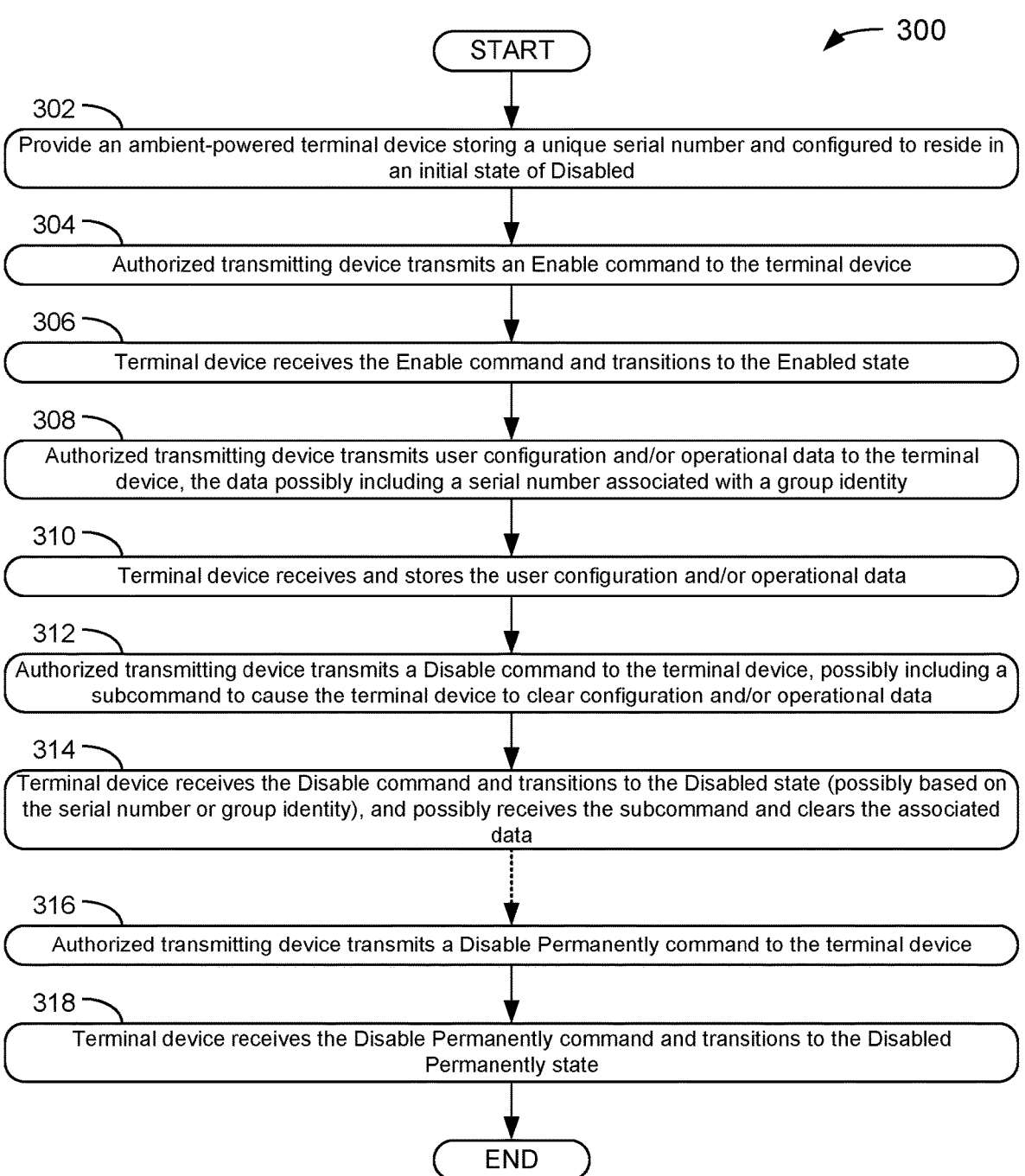
FIG. 3 is a flowchart illustrating operations performed by a terminal device and an authorized transmitting device, according to an example implementation of the present disclosure.

FIG. 3 is a flowchart illustrating operations 300 performed by a terminal device and an authorized transmitting device, according to an example implementation of the present disclosure. As indicated above, in some implementations, the terminal device may be an ambient-power-enabled IoT device, and the authorized transmitting device may be a gNB or base station device that provides the functionality ascribed thereto, as discussed herein. While the operations depicted in FIG. 3 are presented in a particular order, other orders of execution for the operations are also possible. Also, while a particular set of operations are presented in FIG. 3, greater or fewer operations than that shown may be included in other implementations.

In operation 302, a terminal device is provided that may store (e.g., in read-only nonvolatile memory, such as Read-Only Memory (ROM)) a unique serial number identifying the device (e.g., a serial number that is unique among all potentially constructed ambient-power-enabled IoT devices), and that is configured to reside in an initial state of a DISABLED state (e.g., DISABLED state 202). In some implementations, while in the initial DISABLED state, the terminal device may not be provisioned with any configuration and/or operational data. Thereafter, in operation 304, the authorized transmitting device may transmit an Enable command (e.g., Enable command 214). In some implementations, the Disable command and/or other commands described herein may be transmitted by the authorized transmitting device via one or more signaling methods, including, but not limited to, broadcast system information and dedicated signaling. In response, in operation 306, the terminal device may receive and execute the Enable command to transition to an ENABLED state (e.g., ENABLED state 204).

While the terminal device is in the ENABLED state, the authorized transmitting device, in operation 308, may transmit user configuration and/or operational data to the terminal device. In some implementations, the configuration data may include a serial number associated with a group identity (e.g., a group of similar devices of which the terminal device is a member). In response, in operation 310, the terminal device may receive and store the user configuration and/or operational data (e.g., in a writable nonvolatile memory).

In operation 312, the authorized transmitting device may transmit a Disable command (e.g., Disable command 212) to the terminal device. In some implementations, the Disable command may include a subcommand to cause the terminal device to clear configuration and/or operational data that is stored at the terminal device. Accordingly, in operation 314, the terminal device may receive the Disable command and transition to the DISABLED state (e.g., based on the serial number or the group identity stored in the terminal device). Further, if the Disable command includes the subcommand to clear the configuration and/or operational data, the terminal device may clear the associated data (e.g., the group identity stored in the terminal device).

In some implementations, authorized transmitting device may transmit additional ENABLE and DISABLE commands during the lifecycle of the terminal device (e.g., as indicated in operations 304 and 312), and the terminal device may execute the commands to perform the corresponding state transitions and associated operations (e.g., as indicated in operations 306 and 314).

Thereafter, in operation 316, the authorized transmitting device may transmit a Disable Permanently command (e.g., Disable Permanently command 216) to the terminal device, and in operation 318, the terminal device may receive the Disable Permanently command and transition to a DISABLED_PERMANENTLY state (e.g., DISABLED_PERMANENTLY state 206). In some implementations, if the Disable Permanently command was not received in the form of an SIB message, the terminal device may transmit an acknowledgement message that may indicate an acknowledgement that the Disable Permanently command was received, and/or an indication of an intent or lack thereof by the terminal device to execute the command to transition to the DISABLED_PERMANENTLY state.

Figure 4:
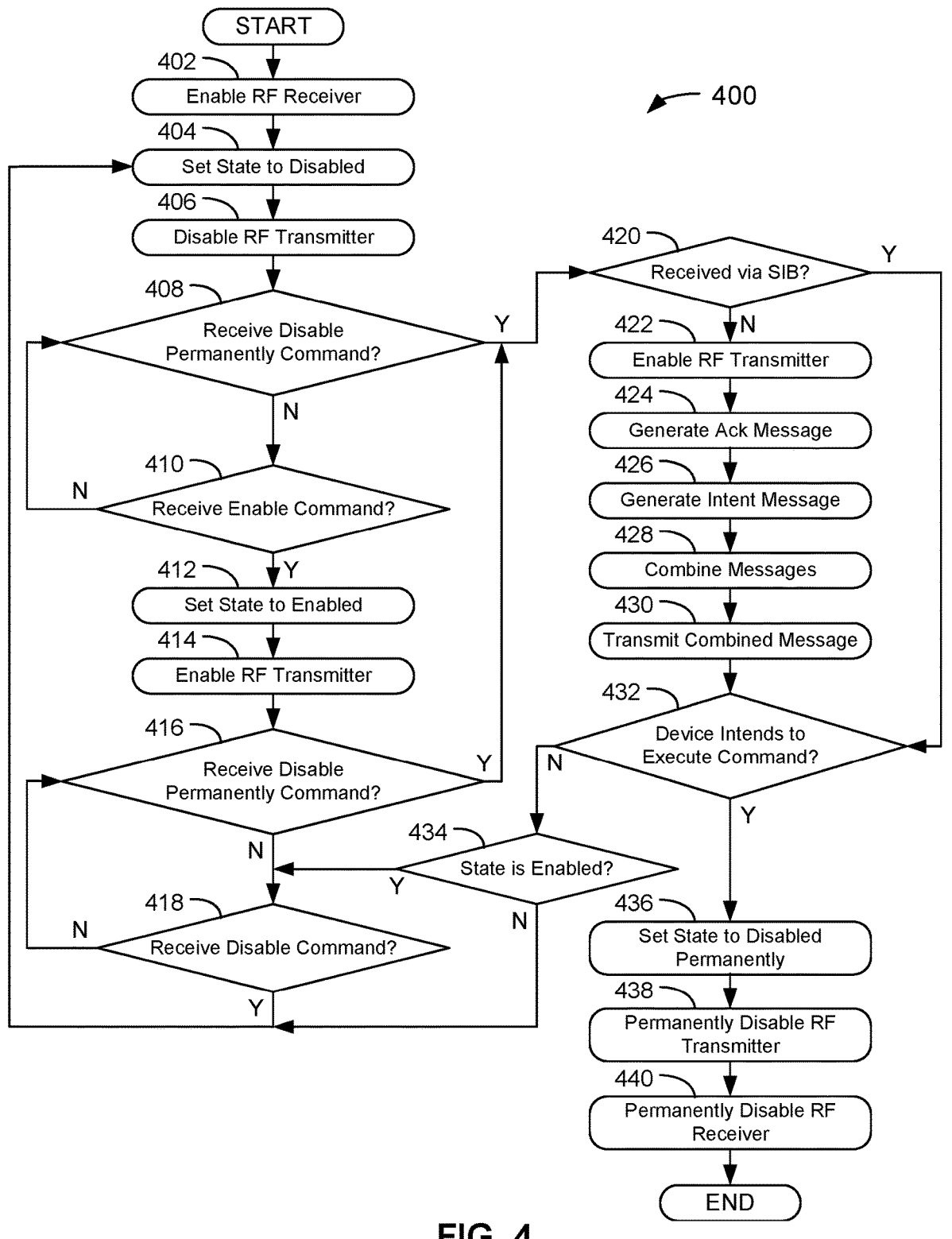
FIG. 4 is a flowchart illustrating a method performed by a terminal device for transition among various states during the lifecycle of the device, according to an example implementation of the present disclosure.

FIG. 4 is a flowchart illustrating a method 400 performed by a terminal device for transition among various states during the lifecycle of the device, according to an example implementation of the present disclosure. While the operations depicted in FIG. 4 are presented in a particular order, other orders of execution for the operations are also possible. Also, while a particular set of operations are presented in FIG. 4, greater or fewer operations than that shown may be included in other implementations.

In the method 400, the terminal device (e.g., UE 102 of FIG. 1 serving as an ambient-power-enabled IoT device) may enable its RF receiver in operation 402, set its current state to DISABLED (e.g., DISABLED state 202 of FIG. 2) in operation 404, and disable its RF transmitter in operation 406. In some implementations, the overall operational status of the terminal device may be configured at the time of manufacture such that one or more of operations 402, 404, and 406 need not be explicitly executed upon the initial use of the terminal device.

In operation 408, the terminal device may determine whether either a Disable Permanently command (e.g., Disable Permanently command 216 of FIG. 2) is received in operation 408 or an Enable command (e.g., Enable command 214 of FIG. 2) is received in operation 410 (e.g., from an authorized transmitting device). If the Enable command is received in operation 410, the terminal device may set its operational state to ENABLED (e.g., ENABLED state 204 of FIG. 2) in operation 412, and enable its RF transmitter in operation 414. The terminal device may then determine whether a Disable Permanently command is received in operation 416 or a Disable command (e.g., Disable command 212 of FIG. 2) is received in operation 418.

If, instead, the Disable Permanently command is received in operation 408, the terminal device may then determine, in operation 420, whether the Disable Permanently command was received via an SIB. If not, the terminal device may then acknowledge the reception of the command, as well as acknowledge whether the terminal device intends to execute the command. In some implementation, the terminal device may not intend to execute the command if the terminal device is not capable of executing the command (e.g., does not include the associated hardware and/or software to perform such a command). In some implementations, the terminal device my enable the RF transmitter in operation 422, generate an acknowledgement message in operation 424, generate an intent message in operation 426, combine the acknowledgement and intent messages in operation 428, and transmit the combined message (e.g., to the authorized transmitting device that transmitted the Disable Permanently command to the terminal device) in operation 430.

After completion of operation 430, or if the terminal device determined in operation 420 that the Disable Permanently command received was received via an SIB, the terminal device, if intending in operation 432 to execute the Disable Permanently command, may set its operational state to DISABLED PERMANENTLY (e.g., DISABLED_PERMANENTLY state 206 of FIG. 2) in operation 436, permanently disable its RF transmitter in operation 438, and permanently disable its RF receiver in operation 440, thus permanently disabling the terminal device.

If the terminal device instead determines that it does not intend to execute the Disable Permanently command in operation 432, the terminal device determines whether its current operation state is the ENABLED state in operation 434. If so, the terminal device awaits receiving a Disable command in operation 418 or a Disable Permanently command in operation 416. If a Disable Permanently command is received in operation 416, the terminal device may determine whether the Disable Permanently command as received via an SIB in operation 420, as described above. If, instead, the current operational state of the terminal device is determined to not be ENABLED in operation 434, the terminal device may proceed to operation 404 to ensure the current operational state of the terminal device is DISABLED, and to operation 416 to disable the RF transmitter.

Figure 5:
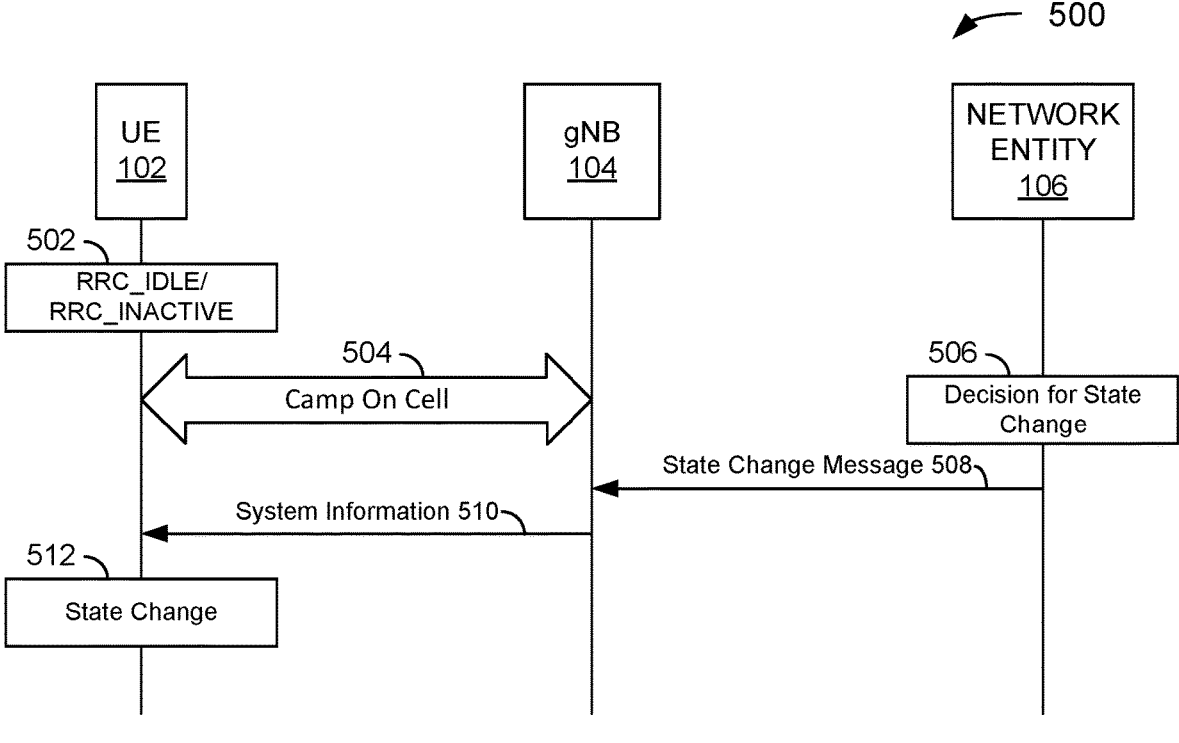
FIG. 5 is a messaging diagram illustrating a message flow among a UE (e.g., serving as an ambient-power-enabled IoT), a Next Generation NodeB (gNB), and a network entity using broadcast system information to facilitate state transitions of the UE, according to an example implementation of the present disclosure.

FIG. 5 is a messaging diagram illustrating a message flow 500 among a UE 102 (e.g., serving as an ambient-power-enabled IoT), a Next Generation NodeB (gNB) 104, and a network entity 106 using broadcast system information to facilitate state transitions of UE 102, according to an example implementation of the present disclosure. In some implementations, network entity 106 may be a server or node in a core network (e.g., an AMF), a server resident in a private/public network, or the like.

In the message flow 500, UE 102 may be in a Radio Resource Control (RRC) IDLE or RRC INACTIVE state 502, during which UE 102 may camp on a cell served by gNB 104 in operation 504. During this time, in operation 506, network entity 106 may decide to change the state of UE 102 (e.g., change to the DISABLED PERMANENTLY state 206 of FIG. 2), as well as that of possibly other UEs. In response to the decision, network entity 106 may broadcast a state change message 508 to inform gNB 104 of the decision. State change message 508 may include one or more state change commands (e.g., one or more Disable Permanently commands 216 of FIG. 2). State change message 508 may include one or more UE-specific identifiers (IDs) (e.g., serial numbers) corresponding to UE 102 and other UEs to which the state change is to be applied. In some implementations, additionally or alternatively, state change message 508 may include one or more device group IDs, where each of the device group IDs identifies a corresponding group of UEs, and where UE 102 is a member of one of the device groups.

In response to receiving state change message 508, gNB 104 may broadcast the contents or indications of state change message 508 in system information 510, such as one or more SIBs. In response to receiving system information 510, UE 102 may determine whether system information 510 includes an indication of a state change command (e.g., the Disable Permanently command) associated with the UE-specific ID of UE 102 or a group ID for a group that includes UE 102. If system information 510 includes such a state change command, UE 102 may execute the state change command to facilitate a state change 512 (e.g., to the DISABLED_PERMANENTLY state).

Figure 6:
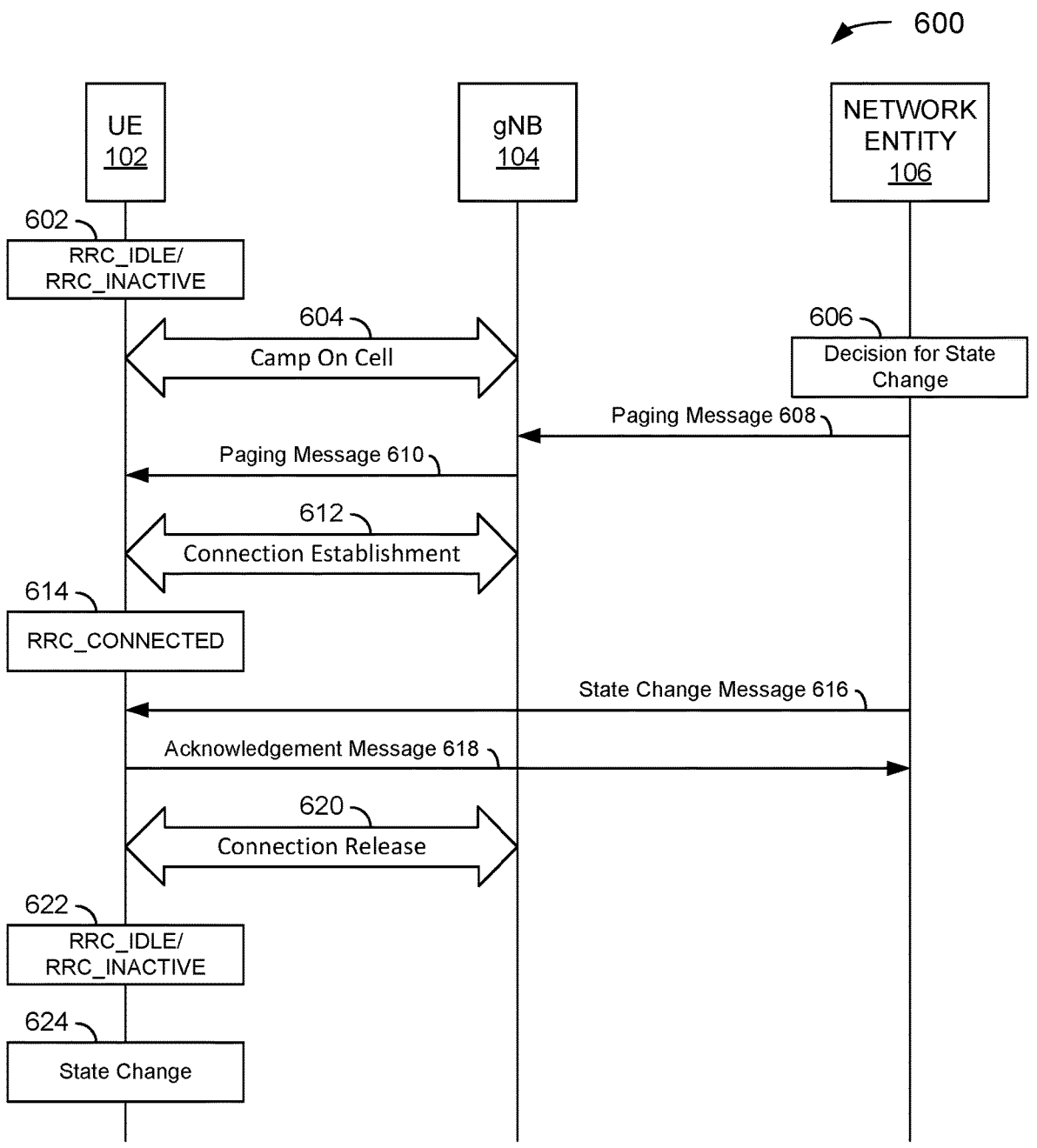
FIG. 6 is a messaging diagram illustrating a message flow among a UE, a gNB, and a network entity using dedicated signaling to facilitate state transitions of the UE, according to an example implementation of the present disclosure.

FIG. 6 is a messaging diagram illustrating a message flow 600 among UE 102, gNB 104, and network entity 106 using dedicated signaling to facilitate state transitions of UE 102, according to an example implementation of the present disclosure. The initial portions of message flow 600 may be at least similar to that of message flow 500 of FIG. 5. More specifically, in the message flow 600, UE 102 may be in an RRC IDLE or RRC INACTIVE state 602, during which UE 102 may camp on a cell served by gNB 104 in operation 604. During this time, in operation 606, network entity 106 may decide to change the state of UE 102 (e.g., change to the DISABLED_PERMANENTLY state 206 of FIG. 2), as well as possibly the state of other UEs.

Thereafter, network entity 106 may send a paging message 608 to gNB 104 that includes the UE-specific device ID of UE 102 and/or a group ID applicable to UE 102. In response, gNB 104 may forward paging message 608 as paging message 610 to UE 102. Upon receiving paging message 610, UE 102 may initiate a connection establishment procedure 612 to establish an RRC connection with gNB 104. Once connection establishment procedure 612 is complete, UE 102 may enter an RRC_CONNECTED state 614 with gNB 104. While UE 102 is in the RRC_CONNECTED state 614, network entity 106 may transmit a state change message 616 (e.g., including a Disable Permanently command) via gNB 104 specifically to UE 102. In some implementations, state change message 616 may be a Non-Access Stratum (NAS) message. Additionally or alternatively, state change message 616 may be a user plane message (e.g., including one or more Internet Protocol (IP) packets).

Upon receiving state change message 616, upon receiving state change message 616, UE 102 may send to network entity 106 via gNB 104 an acknowledgement message 618. In some implementations, acknowledgement message 618 may include or indicate an acknowledgement that state change message 616 was received and/or an indication as to whether UE 102 intends to execute the included state change command. After transmission of acknowledgement message 618, gNB 104 may initiate a connection release procedure 620, thus causing UE 102 to enter the RRC_IDLE or RRC_INACTIVE state 622. Thereafter, UE 102 may perform the state change command received in state change message 616 to facilitate a state change 624.

Figure 7:
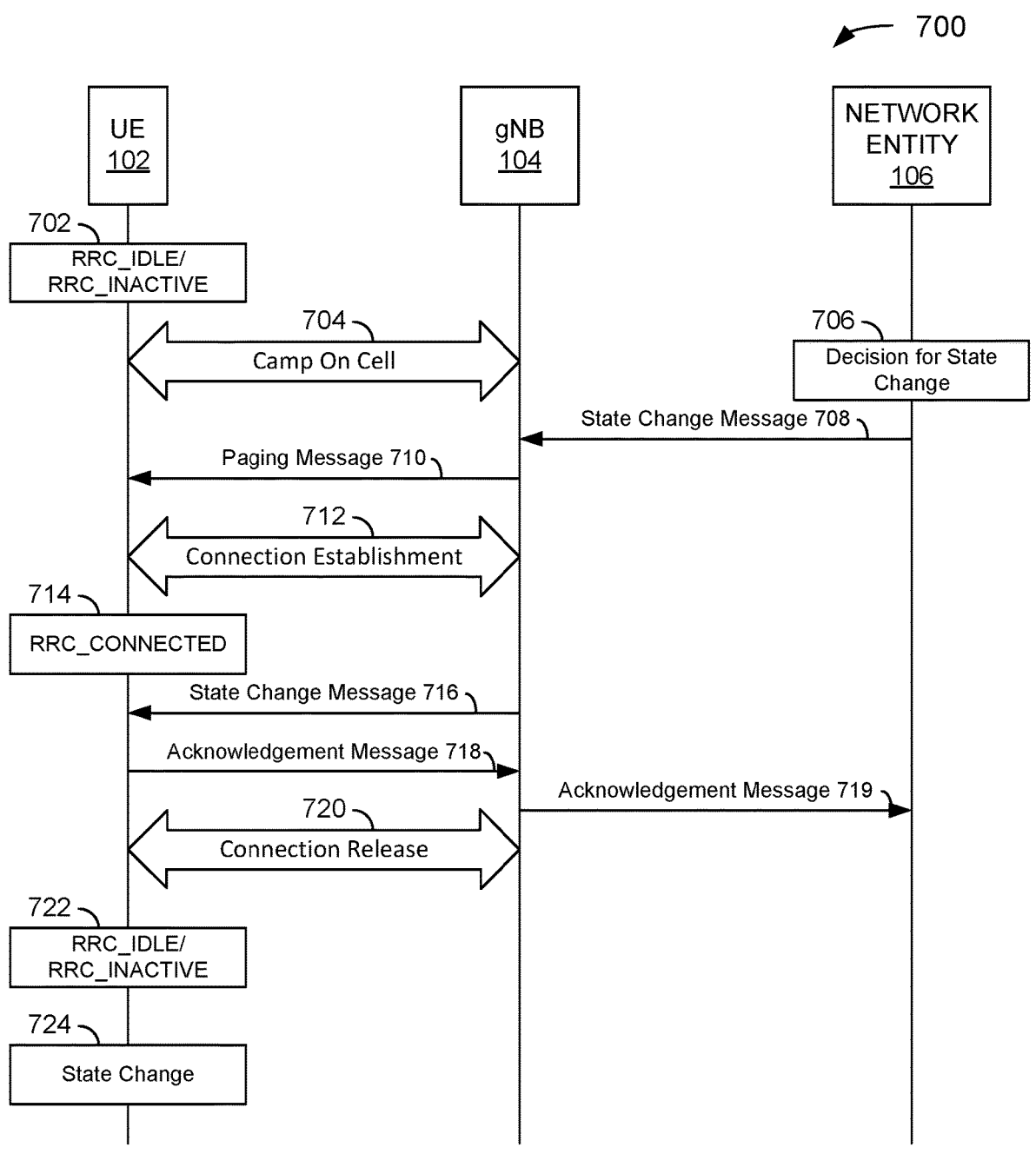
FIG. 7 is a messaging diagram illustrating a message flow among a UE, a gNB, and a network entity using dedicated signaling to facilitate state transitions of the UE, according to another example implementation of the present disclosure.

FIG. 7 is a messaging diagram illustrating a message flow 700 among UE 102, gNB 104, and network entity 106 using dedicated signaling to facilitate state transitions of UE 102, according to another example implementation of the present disclosure. The initial portions of message flow 700 may be at least similar to that of message flow 500 of FIG. 5. More specifically, in the message flow 700, UE 102 may be in an RRC_IDLE or RRC_INACTIVE state 702, during which UE 102 may camp on a cell served by gNB 104 in operation 704. During this time, in operation 706, network entity 106 may decide to change the state of UE 102 (e.g., change to the DISABLED_PERMANENTLY state 206 of FIG. 2), as well as possibly the states of other UEs.

Thereafter, network entity 106 may send a state change message 708 to gNB 104 that includes a state change command (e.g., including a Disable Permanently command), as well as the UE-specific device ID of UE 102 and/or a group ID applicable to UE 102. In response, gNB 104 may transmit a paging message 710 to UE 102. Upon receiving paging message 710, UE 102 may initiate a connection establishment procedure 712 to establish an RRC connection with gNB 104. Once connection establishment procedure 712 is complete, UE 102 may enter an RRC_CONNECTED state 714 with gNB 104. While UE 102 is in the RRC_CONNECTED state 714, gNB 104 may transmit a state change message 716 via gNB 104 specifically to UE 102. In some implementations, state change message 716 may include the state change command indicated in state change message 708, along with the corresponding UE-specific ID or group ID for UE 102. In some implementations, state change message 716 may be an RRC message (e.g., an RRCReconfiguration message).

Upon receiving state change message 716, UE 102 may send to gNB 104 an acknowledgement message 718 (e.g., an RRCReconfigurationComplete message). In some implementations, acknowledgement message 718 may include or indicate an acknowledgement that state change message 716 was received and/or an indication as to whether UE 102 intends to execute the included state change command. After transmission of acknowledgement message 718, gNB 104 may transmit an acknowledgement message 719 to network entity 106 to inform network entity 106 of the successful delivery of state change message 716, and/or possibly an indication as to whether UE 102 intends to execute the requested state change. Additionally, gNB 104 may initiate a connection release procedure 720, thus causing UE 102 to enter the RRC_IDLE or RRC_INACTIVE state 722. Thereafter, UE 102 may perform the state change command received in state change message 716 to facilitate a state change 724.

As described above, an ambient-power-enabled IoT device may receive, from a gNB or other authorized transmission device, a state change command that is specific to the device, or specific to a group to which the device belongs. When the state change command is a Disable Permanently command, execution of the command by the ambient-power-enabled IoT device may disable the device from at least any further transmission of RF energy and reception/decoding of RF energy.

Further, the ambient-power-enabled IoT device that received the Disable Permanently state change command may also transmit to the authorized transmitting device an acknowledgement message indicating receipt of the state change command and an intent message indicating whether the device intends to execute the state change command before executing the command (e.g., if the state change command was received by the device via an RRC message or a NAS message). However, the ambient-power-enabled IoT device may not transmit the acknowledgement message to the authorized transmitting device if the command was received by the device via an SIB.

Moreover, the various state change commands described herein (e.g., Enable command 214, Disable command 212, and/or Disable Permanently command 216 of FIG. 2) may be transmitted by a gNB or other authorized transmission device in one or more signaling methods. Such signaling methods may include, but are not limited to, broadcast system information and dedicated signaling.

Figure 8:
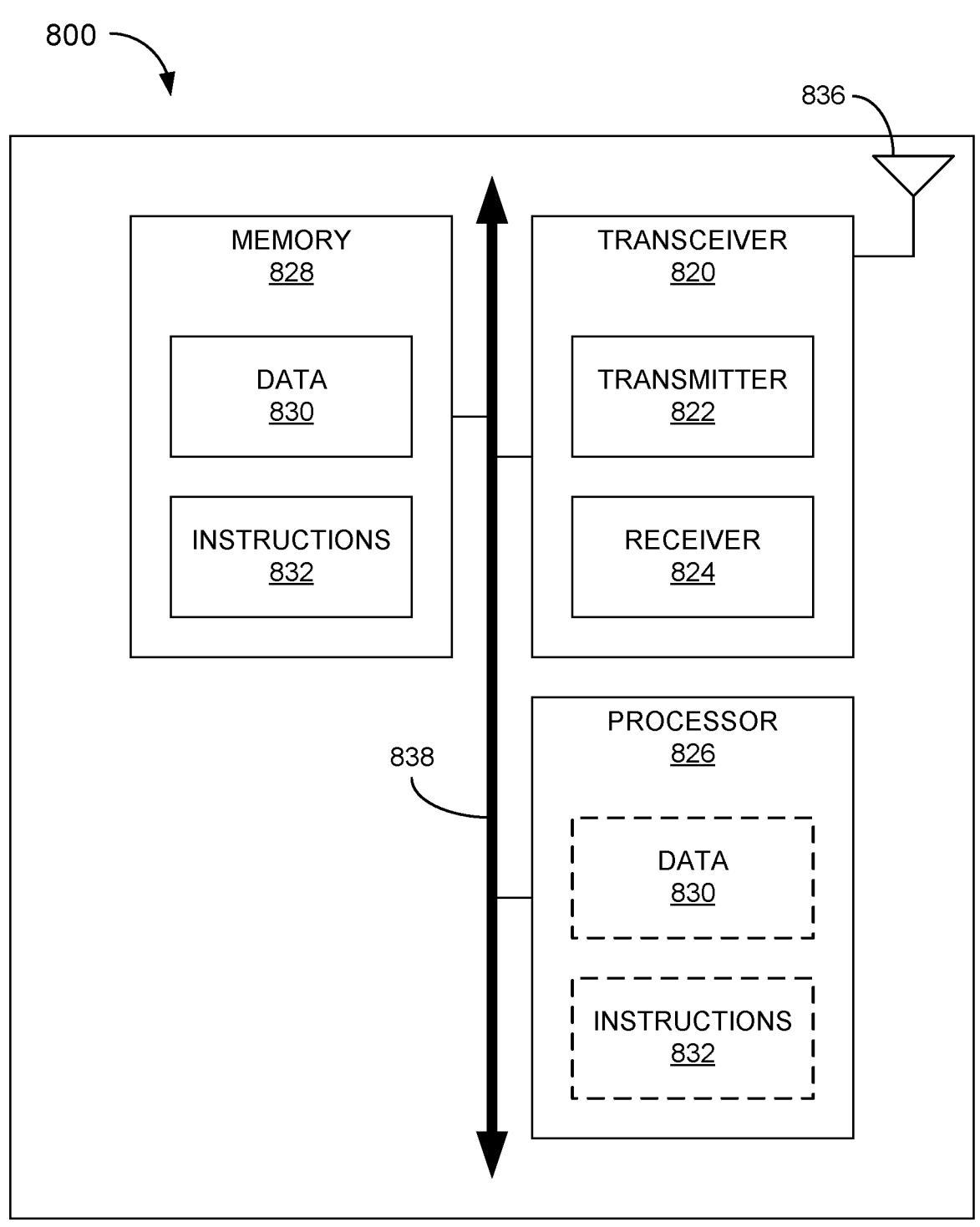
FIG. 8 is a block diagram illustrating a node for wireless communication, according to an example implementation of the present application.

FIG. 8 illustrates a block diagram of a node for wireless communication, according to one example implementation of the present application. As shown in FIG. 8, node 800 may include transceiver 820, processor 826, memory 828, and at least one antenna 836. Node 800 may also include a radio frequency (RF) spectrum band module, a base station communications module, a network communications module, and a system communications management module, input/output (I/O) ports, I/O components, and power supply (not explicitly shown in FIG. 8). Each of these components may be in communication with each other, directly or indirectly, over one or more buses 840.

Transceiver 820 having transmitter 822 and receiver 824 may be configured to transmit and/or receive time and/or frequency resource partitioning information. In some implementations, transceiver 820 may be configured to transmit in different types of subframes and slots including, but not limited to, usable, non-usable, and flexibly usable subframes and slot formats. Transceiver 820 may be configured to receive data and control signaling.

Node 800 may include a variety of computer-readable media. Computer-readable media can be any available media that can be accessed by node 800 and include both volatile and nonvolatile media, removable and nonremovable media. By way of example, and not limitation, computer-readable media may include computer storage media and communication media. Computer storage media may include both volatile and nonvolatile, removable and non-removable media implemented in any method or technology for storage of information, such as computer-readable instructions, data structures, program modules, or other data.

Computer storage media include random-access memory (RAM), read-only memory (ROM), electrically erasable programmable read-only memory (EEPROM), flash memory, or other memory technology, compact disc read-only memory (CD-ROM), digital versatile disk (DVD), or other optical disk storage, magnetic cassettes, magnetic tape, magnetic disk storage, or other magnetic storage devices. Computer storage media do not include a propagated data signal. Communication media typically embody computer-readable instructions, data structures, program modules, or other data in a modulated data signal, such as a carrier wave, or other transport mechanism and includes any information delivery media. The term "modulated data signal" means a signal that has one or more of its characteristics set or changed in such a manner as to encode information in the signal. By way of example, and not limitation, communication media include wired media, such as a wired network or direct-wired connection, and wireless media, such as acoustic, RF, infrared, and other wireless media. Combinations of any of the above should also be included within the scope of computer-readable media.

Memory 828 may include computer-storage media in the form of volatile and/or nonvolatile memory. Memory 828 may be removable, nonremovable, or a combination thereof. Exemplary memory includes solid-state memory, hard drives, optical-disc drives, etc. As illustrated in FIG. 8, memory 828 may store computer-readable, computer-executable instructions 832 (e.g., software codes) that are configured to, when executed, cause processor 826 to perform various functions described herein, for example, with reference to FIGS. 1 through 7. Alternatively, instructions 832 may not be directly executable by processor 826 but be configured to cause node 800 (e.g., when compiled and executed) to perform various functions described herein.

Processor 826 may include an intelligent hardware device, for example, a central processing unit (CPU), a microcontroller, an application-specific integrated circuit (ASIC), etc. Processor 826 may include memory. Processor 826 may process data 830 and instructions 832 received from memory 828, and information through transceiver 820, the baseband communications module, and/or the network communications module. Processor 826 may also process information to be sent to transceiver 820 for transmission through antenna 836, to the network communications module for transmission to a core network.

From the above description, it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A terminal device connected to a New Radio (NR) network, the terminal device comprising:
   radio frequency (RF) transmission circuitry;
   RF reception circuitry;
   one or more non-transitory computer-readable media storing a set of computer-executable instructions; and
   at least one processor coupled to the one or more non-transitory computer-readable media and configured to execute the set of computer-executable instructions to cause the terminal device to perform operations comprising:
      receiving, by the RF reception circuitry, from a transmitting device, while the terminal device is in an enabled state or a disabled state, a command to permanently disable the terminal device; and
      transitioning, in response to receiving the command to permanently disable the terminal device, to a permanently disabled state, wherein:
         when the terminal device is in the enabled state, the RF reception circuitry and the RF transmission circuitry are enabled,
         when the terminal device is in the disabled state, the RF reception circuitry is enabled and the RF transmission circuitry is disabled, and when the terminal device is in the permanently disabled state, the RF reception circuitry and the RF transmission circuitry are disabled,
   wherein the terminal device:
      receives, from the transmitting device, a command to enable the terminal device, the command to enable the terminal device including an indication of a group identifier (ID) associated with a plurality of terminal devices that includes the terminal device,
      stores, in a nonvolatile read-only memory of the terminal device, the group ID,
      receives, from the transmitting device, while the terminal device is in the enabled state, a command to transition the terminal device to the disabled state, the command to transition the terminal device to the disabled state comprising a subcommand to clear at least the group ID from the nonvolatile read-only memory, and
      clears, in response to receiving the subcommand, at least the group ID from the nonvolatile read-only memory.

2. The terminal device of claim 1, wherein:
the terminal device comprises an ambient-power-enabled Internet-of-Things (IOT) device.

3. The terminal device of claim 1, wherein:
the transmitting device comprises a base station.

4. The terminal device of claim 1, wherein:
a device ID identifying the terminal device is stored in the nonvolatile read-only memory,
the device ID is unique among the plurality of terminal devices, and
the command to permanently disable the terminal device includes an indication of the device ID.

5. The terminal device of claim 1, wherein:
the transmitting device is a base station, and
when the terminal device is in the disabled state, receiving the command to permanently disable the terminal device while the terminal device is in the enabled state or the disabled state comprises receiving the command to permanently disable the terminal device from the base station while the terminal device is in a Radio Resource Control (RRC)_IDLE state or an RRC_INACTIVE state and camped on the base station.

6. The terminal device of claim 5, wherein:
the command to permanently disable the terminal device is received in at least one system information block (SIB) transmitted by the base station.

7. The terminal device of claim 1, wherein:
the transmitting device is a base station, and
when the terminal device is in the enabled state, receiving the command to permanently disable the terminal device while the terminal device is in the enabled state or the disabled state comprises receiving the command to permanently disable the terminal device from the base station while the terminal device is in a Radio Resource Control (RRC)_CONNECTED state with the base station.

8. The terminal device of claim 7, wherein:
the command to permanently disable the terminal device is received in an RRC message transmitted by the base station.

9. The terminal device of claim 8, wherein:
the RRC message comprises an RRCReconfiguration message.

10. The terminal device of claim 7, wherein:

the command to permanently disable the terminal device is received in a Non-Access Stratum (NAS) message transmitted by the base station.

11. A terminal device connected to a New Radio (NR) network, the terminal device comprising:

radio frequency (RF) transmission circuitry;

RF reception circuitry;

one or more non-transitory computer-readable media storing a set of computer-executable instructions; and at least one processor coupled to the one or more non-transitory computer-readable media and configured to execute the set of computer-executable instructions to cause the terminal device to perform operations comprising:

receiving, by the RF reception circuitry, from a based station, while the terminal device is in an enabled state or a disabled state, a command to permanently disable the terminal device, wherein the enabled state comprises a Radio Resource Control (RRC) CONNECTED state;

enabling the RF transmission circuitry after receiving the command to permanently disable the terminal device;

transmitting, by the RF transmission circuitry, to the base station, in response to receiving the command to permanently disable the terminal device, an acknowledgment message comprising at least one of:

an indication that the command to permanently disable the terminal device was received by the terminal device, and an indication of whether the terminal device intends to execute the command to permanently disable the terminal device; and transitioning to a permanently disabled state, wherein:

when the terminal device is in the enabled state, the RF reception circuitry and the RF transmission circuitry are enabled, when the terminal device is in the disabled state, the RF reception circuitry is enabled and the RF transmission circuitry is disabled, and when the terminal device is in the permanently disabled state, the RF reception circuitry and the RF transmission circuitry are disabled.

12. A method performed by a terminal device connected to a New Radio (NR) network, the method comprising:

receiving, by radio frequency (RF) reception circuitry of the terminal device, from a base station, while the terminal device is in an enabled state or a disabled state, a command to permanently disable the terminal device, wherein the enabled state comprises a Radio Resource Control (RRC) CONNECTED state; and enabling the RF transmission circuitry after receiving the command to permanently disable the terminal device;

transmitting, by the RF transmission circuitry, to the base station, in response to receiving the command to permanently disable the terminal device, an acknowledgment message comprising at least one of:

an indication that the command to permanently disable the terminal device was received by the terminal device, and an indication of whether the terminal device intends to execute the command to permanently disable the terminal device; and transitioning to a permanently disabled state, wherein:

when the terminal device is in the enabled state, the RF reception circuitry of the terminal device and RF transmission circuitry of the terminal device are enabled, when the terminal device is in the disabled state, the RF reception circuitry is enabled and the RF transmission circuitry is disabled, and when the terminal device is in the permanently disabled state, the RF reception circuitry and the RF transmission circuitry are disabled.

* * * * *